United States Patent [19]

Greiner et al.

[11] 3,789,157

[45] Jan. 29, 1974

[54] SHIELDING DEVICE FOR OVERLAPPING THE FRONT FACE OF A MAGNETIC HEAD IN MAGNETIC TAPE CARTRIDGES OF THE COMPACT CASSETTE TYPE

[76] Inventors: Joachim Greiner, Perutz Photowerke ZN der Agfa-Gevaert AG. Kistlerhofstr. 75; Dieter Engelsmann, Agfa-Gevaert AG Camera - Werk, Postfach D-8000; Josef Gersch, Agfa-Gevaert AG Camera-Werk, Postfach D-8000; Franz Landbrecht, Agfa-Gevaert AG Camera-Werk, Postfach D-8000; Rudolf Muller, Agfa-Gevaert AG Camera-Werk, Postfach D-8000; Wolfgang Wenger, Agfa-Gevaert AG Camera-Werk, Postfach D-8000; Otto Wiedemann, Agfa-Gevaert AG Camera-Werk, Postfach D-8000, all of Munich, Germany

[22] Filed: July 19, 1971

[21] Appl. No.: 163,605

[30] Foreign Application Priority Data

July 24, 1970 Germany .......................... 2036754

[52] U.S. Cl. .......................................... 179/100.2 Z

[51] Int. Cl. .......................................... G11b 23/08

[58] Field of Search .............................. 179/100.2 Z

[56] References Cited

UNITED STATES PATENTS 3,126,162 3/1964 MacKenzie .................. 179/100.2 Z

*Primary Examiner*—Vincent P. Canney
*Assistant Examiner*—Robert S. Tupper
*Attorney, Agent, or Firm*—Connolly and Hutz

[57] ABSTRACT

A device for shielding magnetic tape cassettes includes a hollow sheet metal parallelepiped with side recesses and with the shielding walls of the parallelepiped arranged to overlap the front face of a head and also the sound head shielding.

11 Claims, 7 Drawing Figures

SHIELDING DEVICE FOR OVERLAPPING THE FRONT FACE OF A MAGNETIC HEAD IN MAGNETIC TAPE CARTRIDGES OF THE COMPACT CASSETTE TYPE

BACKGROUND OF INVENTION

The invention relates to a means for the magnetic shielding of the front face of a head which is situated in a magnetic tape cassette.

In general, magnetic heads are protected by shielding against magnetic interference fields. These shields usually consist of highly permeable material. Also employed are laminated systems consisting of magnetically and electrically well-conducting substances.

The magnetic head, in normal magnetic tape devices, is essentially inclosed by shielding with the exception of the front face of a head on which the tape lies. In order also to shields off the head mirror with the slot, flaps are pressed in front of the head after laying on the magnetic tape in such a manner that in a horizontal position of the head and in a vertical position of the slot, they lie flat against the shielding, both top and bottom.

The effect of the magnetic interference fields greatly depends on the incident direction. The head symmetrics plays an essential role in this connection. A distinction is to be made between the pure induction effect which affects the reproduction and the concentration of the interference field from the slot which falsifies the recording. The principles of the shielding in magnetic tape devices, which operate with free spool winders, are used in a modified manner in cassette devices.

Tape cassettes have already been proposed which are affixed to the magnetic heads, which are immovably connected with the magneton device. According to the German Design Patent 1,809,754, for such cassettes a combined shielding for the head is mounted in the cassette. With the necessary recesses in the cassette for receiving the heads, the shielding may not completely inclose the head. At the bottom side of the cassette, it may at most reach up to the front face of a head from the side of the tape.

In another cassette construction, the so-called compact cassette, the magnetic heads provided with a shield may movably be connected with the device. During operation, they are introduced into the cassette at its frontal side. The part of the shield which is to cover the front face of a head is located at the cassette in the form of a flat or U-shaped sheet of metal. This type of shielding is insufficient for many purposes and is relatively more expensive due to the iron-nickel alloys of high permeability usually used.

SUMMARY OF INVENTION

The object of this invention consists of improving the shielding of the front face of a head in compact cassettes by suitable shaping.

According to the invention, the shielding of the front face of a head in principle consists of a hollow parallelepiped open at one side with a part of the sound head being pushed in through the open surface of the parallelepiped. The remaining surfaces are formed in such a manner that after the pushing in they lverlap the sound head and the device-attached head screen. This overlapping allows the magnetic interference flow to go from one shield part to another with relatively little resistance. Thus, the touching of the device-attached head screen with at least two surfaces, preferably the upper and lower surface of the parallelepiped, is to be strive for. Due to the novel form of shielding the front face of a head, the effect of the shielding material is strongly decreased. In place of the highly permeable alloys, particularly the expensive NiFe alloys, there is achieved in the parallelepiped with cheaper materials of relatively low permability, such as weakly magnetic grades of iron, the same or better shielding than with the highly permeable materials in the plane or U-shaped construction of the head shield. In the novel parallelepiped-shaped head shielding consisting of weakly magnetic grade of iron, such as may be used as dynamo sheet iron, stamping core plate, etc., the sheet strength may also be reduced by up to one-half as compared to the previous screening forms. Magnetic anisotropic materials, such as poured sheet metal, have shown themselves to be suitable for shielding. If the magnetic preferred axis in the tape run direction is selected, there results a good deviation of the magnetic flux around the head, while the eddy current formation is decreased in the sheet metal plane.

For corrosion prevention of the soft metal sheets under disadvantageous environmental factors, such as high air moisture, the surface may be protected by copper plating or zinc plating.

THE DRAWINGS

DETAILED DESCRIPTION

The inventive device is particularly adpated for use in an arrangement such as disclosed in German Patent 1,191,978. The screening or shielding device is of open box construction in the form of a hollow unilaterally opening parallelepiped with back wall 5 being connected perpendicularly to side walls 1–4 which are constructed in such a manner that they overlap at least the sound head pushed into the cassette. In this connection, touching of the device-connected head shielding may take place by the upper and the lower surface 1, 2. The box or pot shaped shield of course may also be rounded off. Special advantages with respect to the eddy currents and also the manufacture are achieved in that the four edges 3*a*, 3*b*, 4*a*, 4*b*, stand perpendicularly on the back wall 5, are slotted, and thus form fine air slots. While the pot-shaped shield may be manufactured without slotted edges only in the cupping process, the above-described form may also be obtained by a stamping, punching or bending process.

Figure 1:
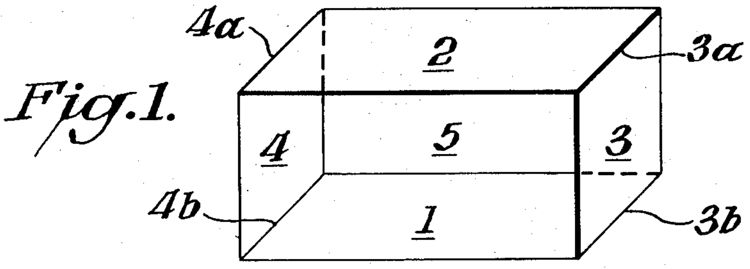
FIG. 1 is a perspective front view of a head shield or shielding device in accordance with this invention.
Figure 2:
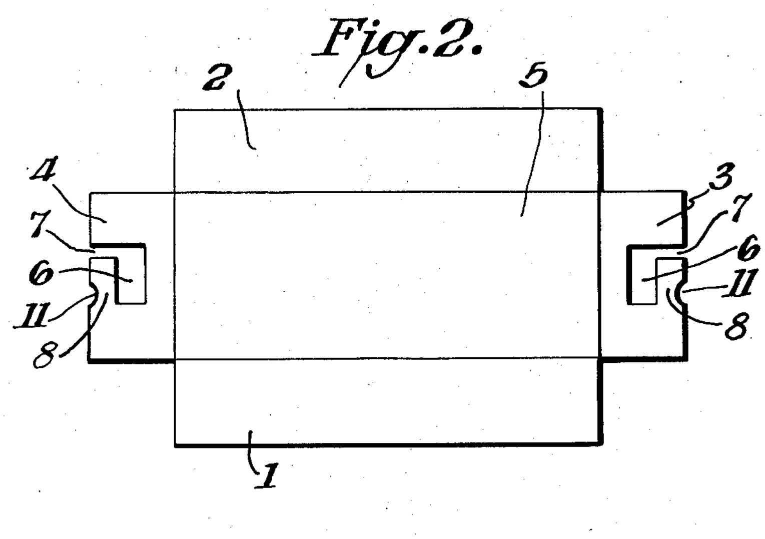
FIG. 2 is a development of the unilaterally opening parallelepiped form.
Figure 3:
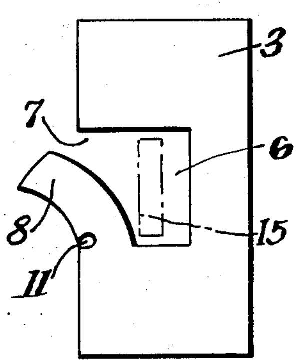
FIGS. 3–5 are various forms of recesses in the side surfaces of the head shield shown in FIGS. 1–2 for the taking up of the tape pressure spring.
Figure 4:
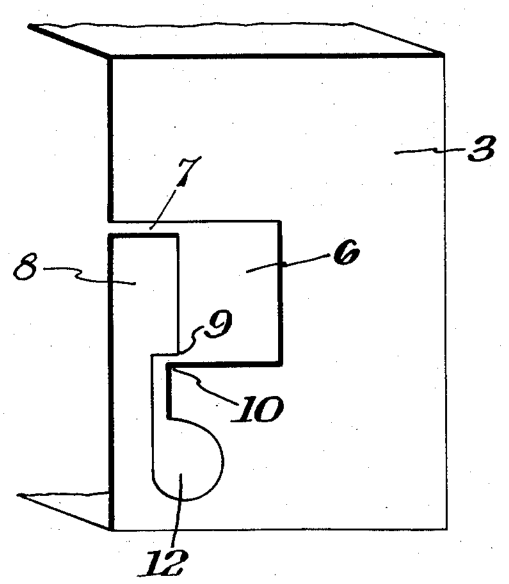
Figure 5:
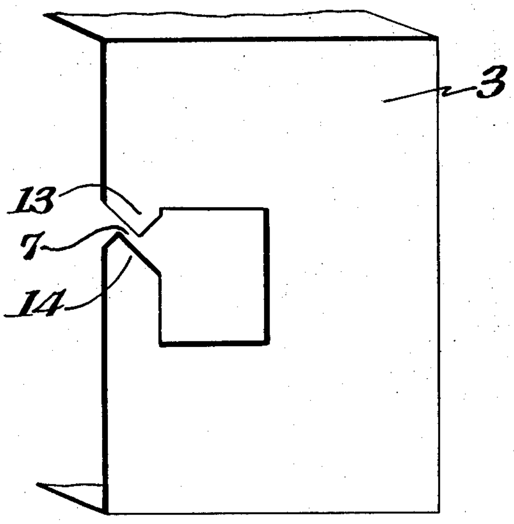

A particular advantage of the novel shield is shown in FIGS. 3–5 in that the front face of a head or level screen and the metal tape pressure spring 15 may be manufactured as a uniform structural element, something which works itsellf out favorably in an automated further processing of the sound tape cassettes. In this connection, the side surfaces 3, 4 each have an indentation 6 made in order to receive in a secure manner the U-shaped pressure spring 15 (FIGS. 2–5). The recess generally has the shape of a rectangle although it can have other geometrical shapes such as a triangle. The outer edges of the side surfaces 3, 4 contain a slot 7 in the height or level of the recesses 6. By way of finger 8 resulting thereby, the pressure spring may be inserted into the recess 6. Finger 8 may be bent for the purpose of the enlargement of the slot space 7 during insertion. This bending is simplified by an indentation 11. Finger 8 in this connection may either be bent from the image plane or laterally as shown in FIG. 3. It may also be punched as a supported finger. In order to avoid breaking the finger 8, the angle about which the finger is bent may be reduced. For this purpose, the recess 6 is continued downward at right angles so that there results according to FIG. 4 a slot between the edge 9 and finger 8 and the edge 10 of the recess 6 which ends in a unilateral arch 12 in the direction of the back wall 5. In order to avoid a falling out of spring 15, the edges 9, 10 are reciprocally staggered. According to FIG. 5, the slot 7 may be formed by two wedge-shaped punch-outs 13, 14, which may also be reciprocally staggered. Upon insertion of the pressure spring, it may be closed by compression.

The shielding effect is also intensified by inserting one into the other of several shielding parallelepipeds. If because of lack of space the use of several complete parallelepipeds is impossible, a multiplication of U-shaped shielding parts may work out favorably in addition to the shielding parallelepiped.

The superiority of the new parallelepiped form for the shielding of the front face of a head is shown in the following measuring arrangement. The output of a customary cassette recorder, Philips 3302, is connected with a tube voltometer. At a distance of 60 cm, an interference spool, operated with line frequency of 50 Hertz, is guided around the head of the recorder at a constant distance. For characterizing the shielding effect, in this measuring arrangement, the value of the greatest interference voltage is used.

TABLE

| Shielding Form Designation | existing surface | Material | Sheet Metal Strength mm | Interference Voltage So MV | So dB |
|---|---|---|---|---|---|
| plane sheet metal | 5 | dynamo sheet iron 13 W/kg | 0.35 | 31.0 | +5.0 |
| U-shape | 3,4, 5 | do. | 0.35 | 28.5 | +4.3 |
| U-shape | 1,2, 5 | do. | 0.35 | 21.6 | +1.9 |
| Hollow parallele-piped | 1–5 | do. | 0.35 | 17.4 | 0 |
| Do. | 1–5 | poured sheet metal annealed | 0.3 | 15.6 | −1.0 |
| Do. | 1–5 | Mu metal | 0.3 | 14.2 | −1.8 |

The pot-shaped shielding of the front face of a head, with the use of a dynamo sheet iron as compared to the known forms, produces a gain of 5 dB; using Mu metal even a gain of 6.8 dB.

Figure 6:
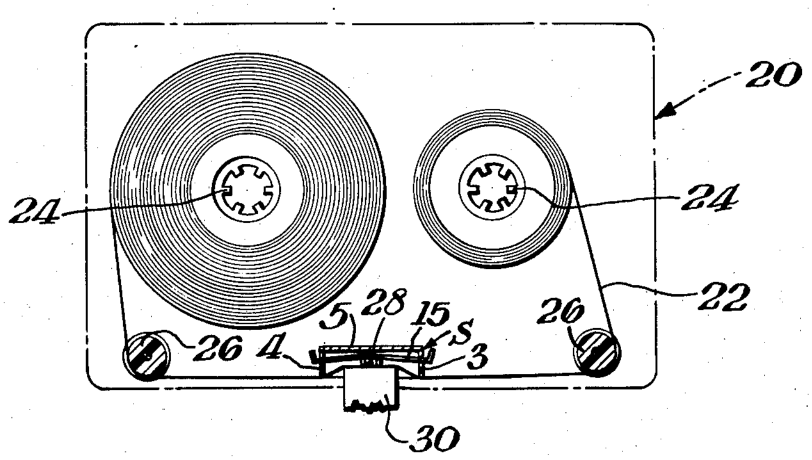
FIGS. 6–7 are cross-sectional plan views schematically showing the head shield of this invention in operation.
Figure 7:
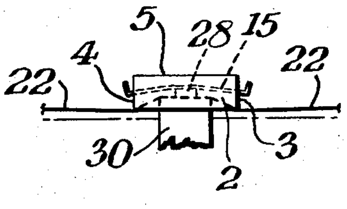

FIGS. 6–7 are cross-sectional views of a compact cassette 20 of the type illustrated in German Patent 1,191,978 and incorporating the shielding device S of this invention. FIG. 6 is a cross-sectional view taken through the center of shielding device S while FIG. 7 is a cross-sectional view taken immediately above the top wall of shielding device S. As indicated therein cassette 20 includes tape 22 wound on cores 25 which pass over guide rollers 26. The compact cassette also includes pressure spring 15 upon which is mounted pressure pad 28 on one side of tape 22 with the magnetic head 30 being moved into contact with the other side of tape 22. As illustrated therein the shielding device S is incorporated in such a manner so that the spring 15 is mounted to the end walls 3, 4 of shielding device S at a point disposed away from the exposed edges of the side walls as, for example, by being mounted in slots in the side walls. Accordingly, when magnetic head 30 is moved into contact with the tape which in turn is in contact with the pressure pad 28 on spring 15 the frontal face of the magnetic head is overlapped on four sides by the top bottom and side walls 1, 2, 3, 4 of shielding device S.

What is claimed is:

1. A device for shielding the front face of a magnetic head used with magnetic tape cassetes in combination, a compact cassette and a hollow parallelepiped, said parallelepiped having a back wall and top and bottom walls and a pair of side walls, the front face of said parallelepiped being open to permit the magnetic head to be inserted therein, and said parallelepiped being made of a sheet metal to provide shielding surfaces from the top and bottom and two side walls thereof which are disposed to completely overlap at least the front face of the magnetic head and said shielding device being mounted in said cassette.

2. A device as set forth in claim 1, wherein the side walls of said parallelepiped each contain a recess, a slot extending from the edge of each side wall and communicating with said recess, and wedge shaped punch outs being above and below said slot spaced from each other to form said slot.

3. A device as set forth in claim 1, wherein the upper and lower edges of said side wall which extend from said back wall are slotted.

4. A device as set forth in claim 1, wherein said sheet metal is soft iron.

5. A device as set forth i n claim 1, wherein said sheet metal has a magnetic axis disposed in the direction of the tape run.

6. A device as set forth in claim 1, in combination therewith a plurality of similarly shaped devices having proportionately larger dimensions, and said similarly shaped devices being nestled in each other.

7. A device as set forth in claim 1, said cassette having a pressure spring on one side of the tape with the magnetic head being movable into contact with the other side of the tape, said spring being in said device spanning said end walls, and the front face of said head being inserted into said device.

8. A device as set forth in claim 7 wherein said side walls are slotted, and said spring extending through the slots.

9. A device as set forth in claim 1, wherein the side walls of said parallelepiped each have a recess and the outer edges of each side wall having a slot at the height of said recess and communicating with said recess for the insertion of a tape pressure spring.

10. A device as set forth in claim 9, wherein each side wall includes a finger formed by said slot and said recess and the base of said finger having an indentation.

11. A device as set forth in claim 9, wherein a right angled slot is disposed at the lower edge of said recess, a finger being formed by said slot which extends from said edge of said side wall and by said recess and said right angled slot, said finger including a shoulder disposed on one side of said right angled slot and said recess including a shoulder on the opposite side of said right angled slot, said shoulders being reciprocally staggered, and said right angled slot terminating in a unilateral arch which extends toward the back wall of said parallelepiped.

* * * * *